United States Patent
Li et al.

(10) Patent No.: US 12,339,347 B2
(45) Date of Patent: Jun. 24, 2025

(54) TRACK FUSION METHOD AND DEVICE FOR UNMANNED SURFACE VEHICLE

(71) Applicant: ZHOUSHAN INSTITUTE OF CALIBRATION AND TESTING FOR QUALITY AND TECHNOLOGY SUPERVISION, Zhoushan (CN)

(72) Inventors: Cunjun Li, Zhoushan (CN); Hairong Wang, Zhoushan (CN); Liang Li, Zhoushan (CN); Yeyong Wang, Zhoushan (CN); Huadong Hao, Zhoushan (CN); Hongbo Wang, Zhoushan (CN); Fangfang Lu, Zhoushan (CN); Kunyu Mao, Zhoushan (CN)

(73) Assignee: ZHOUSHAN INSTITUTE OF CALIBRATION AND TESTING FOR QUALITY AND TECHNOLOGY SUPERVISION, Zhoushan (CN)

( * ) Notice: Subject to any disclaimer, the term of this patent is extended or adjusted under 35 U.S.C. 154(b) by 286 days.

(21) Appl. No.: 18/059,420

(22) Filed: Nov. 28, 2022

(65) Prior Publication Data
US 2023/0104047 A1 Apr. 6, 2023

Related U.S. Application Data

(63) Continuation of application No. PCT/CN2022/114785, filed on Aug. 25, 2022.

(30) Foreign Application Priority Data

Jan. 18, 2022 (CN) .......................... 202210052916.6

(51) Int. Cl.
G01S 13/72 (2006.01)
G01S 13/86 (2006.01)
G05D 1/00 (2024.01)

(52) U.S. Cl.
CPC ............ G01S 13/723 (2013.01); G01S 13/86 (2013.01); G05D 1/0257 (2013.01)

(58) Field of Classification Search
None
See application file for complete search history.

(56) References Cited

U.S. PATENT DOCUMENTS 5,216,611 A * 6/1993 McElreath .............. G01S 19/15
701/472
5,987,395 A * 11/1999 Donges ................... G01S 13/87
702/158

(Continued)

FOREIGN PATENT DOCUMENTS

CN 105390029 A 3/2016
CN 109946700 A 6/2019

(Continued)

*Primary Examiner* — Bernarr E Gregory

(57) ABSTRACT

A track fusion method for an unmanned surface vehicle includes: (a) obtaining perception information of the unmanned surface vehicle, where the perception information includes GPS data information and radar data information; (b) pre-processing the radar data information to obtain target radar information; (c) constructing a track correlation model; and performing track correlation between the GPS data information and the target radar information based on the track correlation model; and (d) constructing a fusion data weight allocation model; and subjecting between the GPS data information and the target radar information correlated therewith to track fusion based on the fusion data weight allocation model. This application further provides a track fusion device for unmanned surface vehicles.

7 Claims, 5 Drawing Sheets

(56) References Cited

U.S. PATENT DOCUMENTS

2012/0044104 A1* 2/2012 Schloetzer ............ G01S 13/878
                     342/357.29
2012/0290146 A1* 11/2012 Dedes .................. G01C 21/165
                     701/1

FOREIGN PATENT DOCUMENTS

| | | |
|---|---|---|
| CN | 110929810 A | 3/2020 |
| CN | 111860589 A | 10/2020 |
| CN | 114415168 A | 4/2022 |
| JP | 2008170386 A | 7/2008 |

* cited by examiner

TRACK FUSION METHOD AND DEVICE FOR UNMANNED SURFACE VEHICLE

CROSS-REFERENCE TO RELATED APPLICATION

This application is a continuation of International Patent Application No. PCT/CN2022/114785, filed on Aug. 25, 2022, which claims the benefit of priority from Chinese Patent Application No. 202210052916.6, filed on Jan. 18, 2022. The content of the aforementioned application, including any intervening amendments thereto, is incorporated herein by reference in its entirety.

TECHNICAL FIELD

This application relates to unmanned surface vehicles, and more particularity to a track fusion method and device for an unmanned surface vehicle.

BACKGROUND

Unmanned surface vehicles (USVs) are intelligent and advanced tools that have been widely used in many fields such as water search and rescue, and hydrometeorological monitoring. In order to ensure the safe navigation, it is necessary for USVs to sense the surrounding objects in real time during the navigation.

However, in addition to the presence of blind spots, the unmanned surface vehicles also have problems in data preprocessing, data format unification, and data fusion weight allocation, such that the data source, data preprocessing and data fusion model during the USV navigation cannot be satisfactorily solved. In order to improve the target sensing capability of the USV during navigation, data collected by the GPS and radar (as data source) deployed in the USV is subjected to data preprocessing, data correction, track correlation and data fusion to reach the high-precision sensing of navigation targets surrounding the USV.

SUMMARY

In view of the deficiencies in the prior art, the present disclosure provides a track fusion method and device for an unmanned surface vehicle to realize the high-precision perception of surrounding navigation targets.

Technical solutions of the present disclosure are described as follows.

In a first aspect, this application provides a track fusion method for an unmanned surface vehicle, including:

(a) obtaining perception information of the unmanned surface vehicle, wherein the perception information comprises global positioning system (GPS) data information and radar data information;

(b) pre-processing the radar data information to obtain a target radar information;

(c) constructing a track correlation model; and performing track correlation between the GPS data information and the target radar information by using the track correlation model; and (d) constructing a fusion data weight allocation model; and subjecting the GPS data information and the target radar information correlated with the GPS data information to track fusion by using the fusion data weight allocation model.

In an embodiment, the step (b) is performed through steps of:

(b1) carrying out data extraction on the radar data information to obtain an intermediate data set;

(b2) processing data rejection on the intermediate data set to obtain the target radar information; and (b3) subjecting data in the target radar information and the GPS data information to spatio-temporal unification.

In an embodiment, the step (b1) is performed through steps of:

(b11) subjecting the radar data information to Cartesian coordinate conversion to obtain a converted data set;

(b12) according to the converted data set, dividing a graph corresponding to the radar data information into multiple subgraphs;

(b13) performing matching between the multiple subgraphs and a target template graph; to select an optimal matched subgraph; and (b14) determining the intermediate data set according to the optimal matched subgraph.

In an embodiment, the step (b2) is performed through steps of:

(b21) determining a first distance according to a coordinate of a first moment and a coordinate of a second moment in the intermediate data set;

(b22) obtaining a time difference between the first moment and the second moment;

(b23) obtaining a second distance according to an average speed between the first moment and the second moment and the time difference;

(b24) obtaining a distance difference between the first distance and the second distance;

(b25) if the distance difference is within a preset threshold range, determining the coordinate of the second moment as a bad value and eliminating the bad value; and (b26) traversing all data in the intermediate data set according to steps (b21)-(b25) to obtain and eliminate all bad values in the intermediate data set, so as to obtain the target radar information.

In an embodiment, the step (c) is performed through steps of:

(c1) subjecting the GPS data information and the target radar information to rough correlation by using a rough correlation model to obtain a rough correlation database; and (c2) subjecting GPS data information in the rough correlation database and the target radar information to fine correlation by using a fine correlation model to screen GPS data information and target radar information satisfying fine correlation relationship.

In an embodiment, the step (c2) includes:

processing the GPS data information in the rough correlation database and the target radar information by using a multi-dimensional Euclidean distance calculation method and a multi-dimensional Mahalanobis distance calculation method.

In an embodiment, the step (d) is performed through steps of:

(d1) determining a weight of an evaluation index of a track influence factor as a first weight vector according to an analytic hierarchy process;

(d2) determining a weight of the evaluation index of the track influence factor as a second weight vector by using an entropy weight method;

(d3) combining the first weight vector with the second weight vector to obtain a combined weight vector; and (d4) subjecting the GPS data information and the target radar information correlated with the GPS data information to the track fusion according to the combined weight vector.

In an embodiment, the step (d1) is performed through steps of:

(d11) constructing a judgment matrix;

(d12) determining a weight assignment vector according to a feature vector corresponding to a largest eigenvalue in the judgment matrix; and (d13) when the judgment matrix has satisfying consistency, determining the weight assignment vector as the first weight vector.

In an embodiment, the step (d2) is performed through steps of:

(d21) constructing a numerical matrix with a plurality of numeric values;

(d22) normalizing the plurality of numeric values in the numerical matrix to obtain a positive index and a negative index corresponding to each of the plurality of numeric values;

(d23) obtaining a characteristic weight of a corresponding numeric value according to the positive index and the negative index;

(d24) determining an entropy value of a corresponding index according to the characteristic weight; and (d25) normalizing entropy values of indexes to obtain the second weight vector.

In a second aspect, this application further provides a track fusion device for an unmanned surface vehicle, including:

an information acquisition module;

a data preprocessing module;

a track correlation module; and a track fusion module;

wherein the information acquisition module is configured to obtain perception information of the unmanned surface vehicle, wherein the perception information comprises GPS data information and radar data information;

the data preprocessing module is configured to pre-process the radar data information to obtain target radar information;

the track correlation module is configured to construct a track correlation model, and perform track correlation between the GPS data information and the target radar information based on the track correlation model; and the track fusion module is configured to construct a fusion data weight allocation model, and subject the GPS data information and the target radar information correlated with the GPS data information to track fusion.

Compared to the prior art, the present disclosure has the following beneficial effects.

(1) Based on the fusion of GPS data and radar data, this application can solve the problems of unstable transmission frequency and backhaul delay in the GPS data transmission and problems of sea clutter interference and small scanning distance in the radar data transmission. Through the correlation and fusion, the complementarity of GPS data and radar data in the perception of maritime targets is achieved.

(2) This application constructs a track correlation mathematical model through the combination of the fine correlation and the rough correlation, and uses the multi-dimensional Euclidean distance calculation method and the multi-dimensional Mahalanobis distance calculation method to perform target track correlation. Therefore, this application can provide various ways for identifying the same target track, improving the matching calculation speed, and saving the computing resources.

(3) This application constructs a fusion data weight allocation model based on the combination of the analytic hierarchy process and the entropy weight method, and thus has a higher reliability.

BRIEF DESCRIPTION OF THE DRAWINGS

In order to illustrate the embodiments of the present disclosure or the technical solutions in the prior art more clearly, the accompanying drawings used in the description of the embodiments or the prior art will be briefly introduced below. Obviously, presented in the accompanying drawings are merely some embodiments of the present disclosure. For those skilled in the art, other drawings can also be obtained based on these drawings without paying creative efforts.

DETAILED DESCRIPTION OF EMBODIMENTS

The disclosure will be further described in detail below with reference to the embodiments and accompanying drawings. Obviously, described below are merely some embodiments of the present disclosure, which are not intended to limit the disclosure. It should be understood that other embodiments obtained by those skilled in the art based on these embodiments without paying creative efforts should fall within the scope of the disclosure defined by the appended claims.

Figure 1:
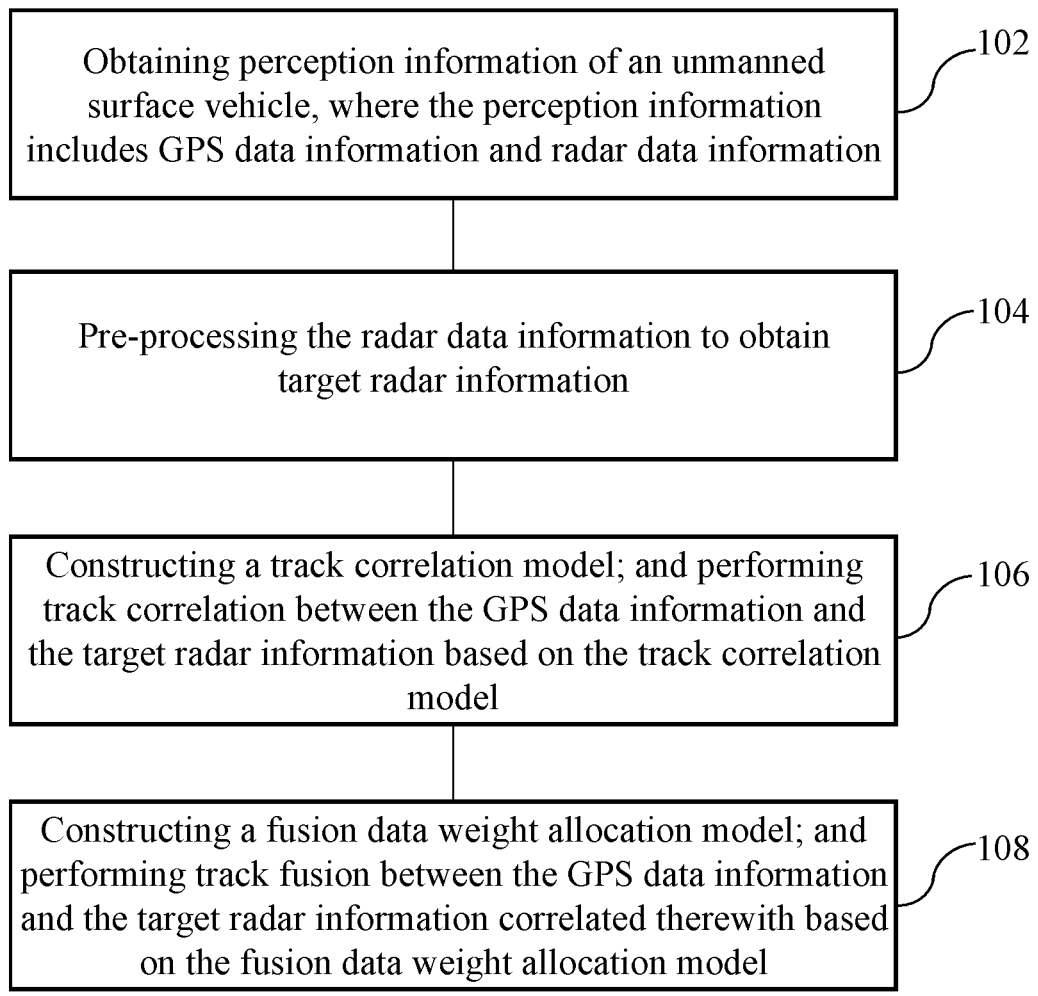
FIG. 1 is a flowchart of a track fusion method for an unmanned surface vehicle according to an embodiment of the present disclosure.

As shown in FIG. 1, this application provides a track fusion method for an unmanned surface vehicle including the following steps.

(S102) The perception information of the unmanned surface vehicle is obtained, where the perception information includes global positioning system (GPS) data information and radar data information.

In practical applications, the step (S102) is performed through the following steps.

(S1.1) The GPS data information and the radar data information are received through a serial interface to obtain a data string.

(S1.2) According to a sensor communication protocol, the data string is checked and decoded to obtain a current speed V, a latitude and longitude L, a heading angle W and other motion status information of the unmanned surface vehicle.

(S104) The radar data information is pre-processed to obtain the target radar information.

In an embodiment, the step (S104) is performed through the following steps.

(S1042) An intermediate data set is obtained by carrying out data extraction on the radar data information.

In an embodiment, the step (S1042) is performed through the following steps.

Polar coordinates of the radar target position are converted to Cartesian coordinates by trigonometric functions, and pixel coordinates are used as the conversion reference in the image coordinate conversion, and the coordinate conversion is completed by formula (1).

$$\begin{cases} x_r = R\sin\theta \\ y_r = R\cos\theta \end{cases} \quad (1)$$

In formula (1), $x_r$ and $y_r$ represent horizontal coordinate and vertical coordinate in the Cartesian coordinates; R represents pole diameter which is the maximum range of radar detection; and $\theta$ represents polar angle.

By comparing the difference between the target template graph and the subgraphs in the graph to determine the matching degree, and the smallest difference is optimal matched.

The target template graph is traversed on the graph, and the absolute difference between the target template graph and the subgraph in the graph is calculated by comparison, and the absolute difference with the minimum value is the optimal matched position.

The minimum error method calculation model can be expressed as formula (2).

$$E(i, j) = \sum_{m=1}^{M} \sum_{n=1}^{N} |S^{i,j}(m, n) - T(m, n)| \quad (2)$$

In the formula (2), E(i, j) is the absolute difference, and the absolute difference with the minimum value is the optimal matched position; the target template graph T is M×N; S is the graph; and $S^{i,j}$ is the subgraph.

The radar Cartesian coordinate image data is converted into the binarization matrix, and the binarization matrix of the target template graph T is defined according to expert experience as formula (3).

$$T = \begin{bmatrix} 0 & 0 & 0 & 0 & 0 & 0 & 0 \\ 0 & 0 & 0 & 0 & 0 & 0 & 0 \\ 0 & 0 & 1 & 0 & 0 & 0 & 0 \\ 0 & 1 & 1 & 1 & 0 & 0 & 0 \\ 0 & 1 & 1 & 1 & 0 & 0 & 0 \\ 0 & 1 & 1 & 1 & 1 & 0 & 0 \\ 0 & 1 & 1 & 1 & 1 & 0 & 0 \\ 0 & 0 & 1 & 1 & 1 & 0 & 0 \\ 0 & 0 & 1 & 1 & 0 & 0 & 0 \\ 0 & 0 & 0 & 0 & 0 & 0 & 0 \\ 0 & 0 & 0 & 0 & 0 & 0 & 0 \end{bmatrix} \quad (3)$$

The error calculation on the graph is carried out by using the template graph matrix T, thereby locating to the optimal matched position of the target and recording the optimal matched position, marking the optimal matched position in the graph data, and obtaining the target coordinates under Cartesian coordinates. Based on the longitude and latitude coordinates and scanning radius of the position of the radar, the navigation data such as the longitude and latitude coordinates, azimuth, and distance of the target is obtained through coordinate conversion and equal proportion calculation methods.

(S1044) The data rejection is processed on the intermediate data set to obtain the target radar information.

In an embodiment, the step (S1044) is performed through the following steps.

The longitude and latitude distance d1 is calculated based on the longitude and latitude position of the previous time point and the longitude and latitude position of the latest time point of the target. As shown in formulas (4) and (5), the distance between two time points is calculated by latitude and longitude.

$$C = \sin(latA) * \sin(latB) * \cos(lonA - lonB) + \cos(latA) * \cos(latB) \quad (4)$$

$$d1 = R * \arccos(C) * \frac{\pi}{180} \quad (5)$$

In the formula, C represents the angle between the two target points to the geocentric connection; lonA and latA, and lonB and latB represent respectively the longitude and latitude of the target at point A and the longitude and latitude of point B; and the point B is the later time point in the trajectory of the target; R represents the average distance of the equator 6371.004 km; $\pi$ represents pi; and D represents the calculated distance between two points.

The distance d2 is calculated from the average speed of the previous time interval and the time difference between the two target points. The error threshold is set, then whether the difference between d1 and d2 is within the threshold range is judged; and if no, the latest time point is judged to be a bad value and eliminated.

(S1046) Data in the target radar information and the GPS data information is subjected to spatio-temporal unification.

Considering that the data update cycle of the radar is short, the route and working conditions are not easy to change suddenly, every two points can be approximated as uniform linear motion. The linear interpolation method applies to the interpolation of GPS data.

$T_1$, $T_2$ two moments are set. GPS target position information is $(\beta_1, \gamma_1)$, $(\beta_2, \gamma_2)$. when $T \in (T_1, T_2)$, T position information can be calculated using formula (6).

$$\beta_T = \beta_2 * \frac{T - T_1}{T_2 - T_1} + \beta_1 * \frac{T_2 - T}{T_2 - T_1} \quad (6)$$

$$\gamma_T = \gamma_2 * \frac{T - T_1}{T_2 - T_1} + \gamma_1 * \frac{T_2 - T}{T_2 - T_1} \quad (7)$$

There is inconsistency between radar and GPS data in space and coordinate system. Radar data is mainly based on the reflection principle of electromagnetic wave, and the radar data is presented in polar coordinates, and the origin of polar coordinates is the base station position. GPS location information is latitude and longitude information, which is the WGS84 coordinate system. Therefore, the GPS target and radar target coordinates are converted into the same coordinate system. The radar base station is in the same place as the GPS base station, and the two coordinates are converted to the Cartesian coordinate system with the base station as the origin.

The latitude and longitude coordinates are converted to Cartesian coordinates using the Gauss-Krüger projection, and the intersection of the central meridian and the equator is projected as the origin, as shown in formula (8).

$$\begin{cases} x = X + Ntg\gamma\cos^2\gamma\beta^2\left[\frac{1}{2} + \frac{1}{24}\cos^2\gamma(5 - tg^2\gamma + 9\eta^2 + 4\eta^4)\beta^4 + \right. \\ \left. \frac{1}{720}\cos^4\gamma(61 - 58tg^2\gamma + tg^2\gamma)\beta^4\right] \\ y = N\beta\cos\gamma\left(1 + \frac{1}{6}\cos^2\gamma(1 - tg^2\gamma + \eta^2)\beta^2 + \right. \\ \left. \frac{1}{120}\cos^4\gamma(5 - 18tg^2\gamma + tg^4\gamma + 14\eta^2 - 58tg^2\gamma\eta^2)\beta^4\right) \end{cases} \quad (8)$$

In the formula (8), $\beta$ and $\gamma$ represent respectively the longitude and latitude under the WGS84 coordinate system; and x and y represent respectively the horizontal and vertical coordinates in the Cartesian coordinate system.

(S106) A track correlation model is constructed; and the track correlation is performed between the GPS data information and the target radar information by using the track correlation model.

In an embodiment, the step (S106) is performed through the following steps.

(S1062) The rough correlation database is obtained by subjecting the GPS data information and the target radar information to rough correlation by using a rough correlation model.

Specifically, the rough correlation is performed as follows.

The GPS longitude and latitude data and the radar parsing latitude and longitude data at a certain time are performed with distance calculation one by one, and the distance threshold is set to determine whether the rough correlation between the two points is successful.

Figure 2:
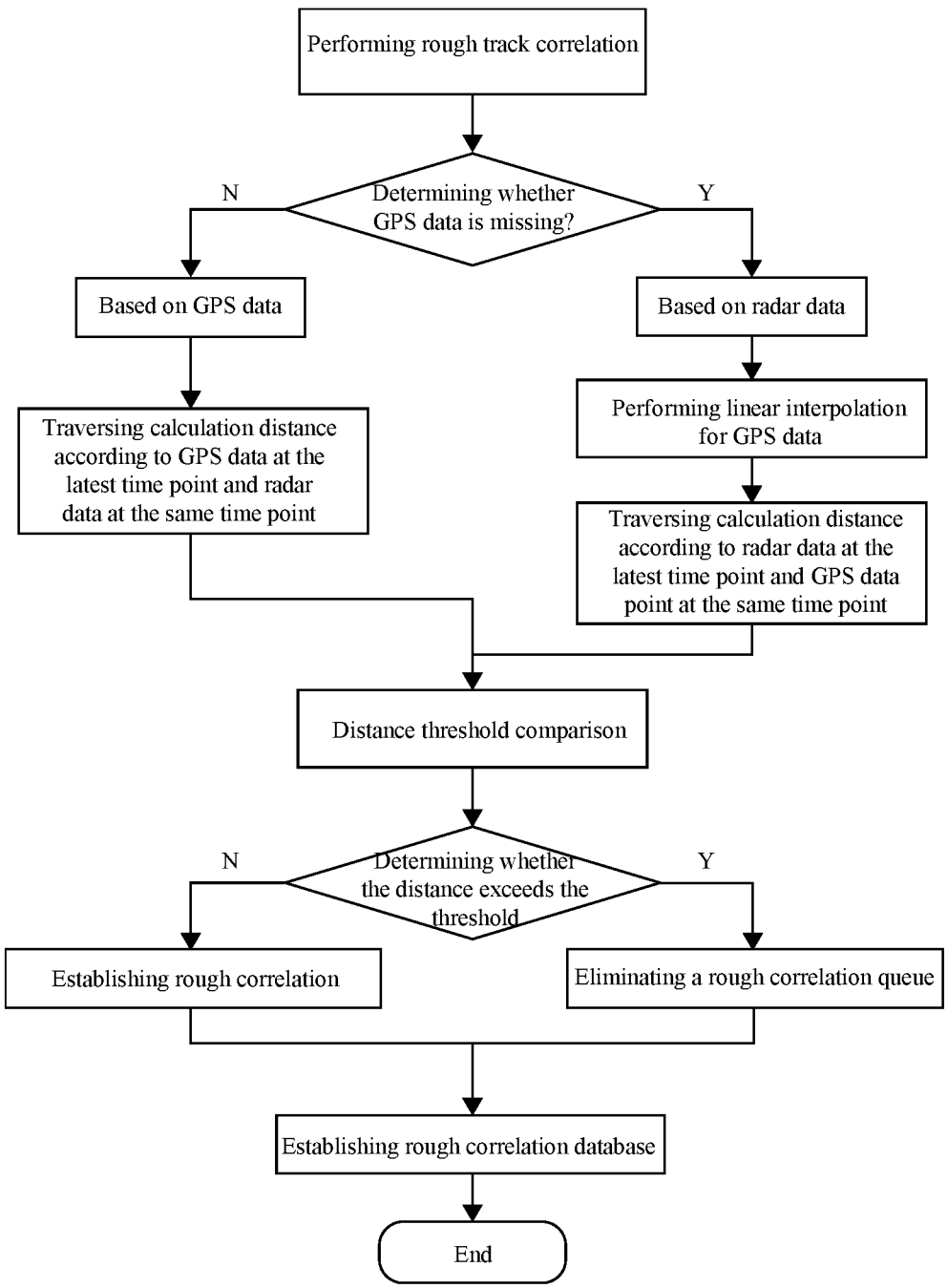
FIG. 2 is a flowchart of a track rough correlation in the construction of a track correlation model according to an embodiment of the present disclosure.

If the calculated distance is greater than the distance threshold, the point is judged to be impossible to be associated; if the distance is less than the threshold, the point is judged to undergo successful rough correlation. Locate records that have established a rough correlation relationship to the rough correlation database are used for fine correlations of subsequent track. A track correlation flowchart is shown in FIG. 2.

(S1064) GPS data information in the rough correlation database and the target radar information are subjected to fine correlation by using a fine correlation model to screen GPS data information and target radar information satisfying the fine correlation relationship.

In an embodiment, the step (S1064) is performed through the following steps.

The GPS data information in the rough correlation database and the target radar information are processed by using the multi-dimensional Euclidean distance calculation method and the multi-dimensional Mahalanobis distance calculation method.

Figure 3:
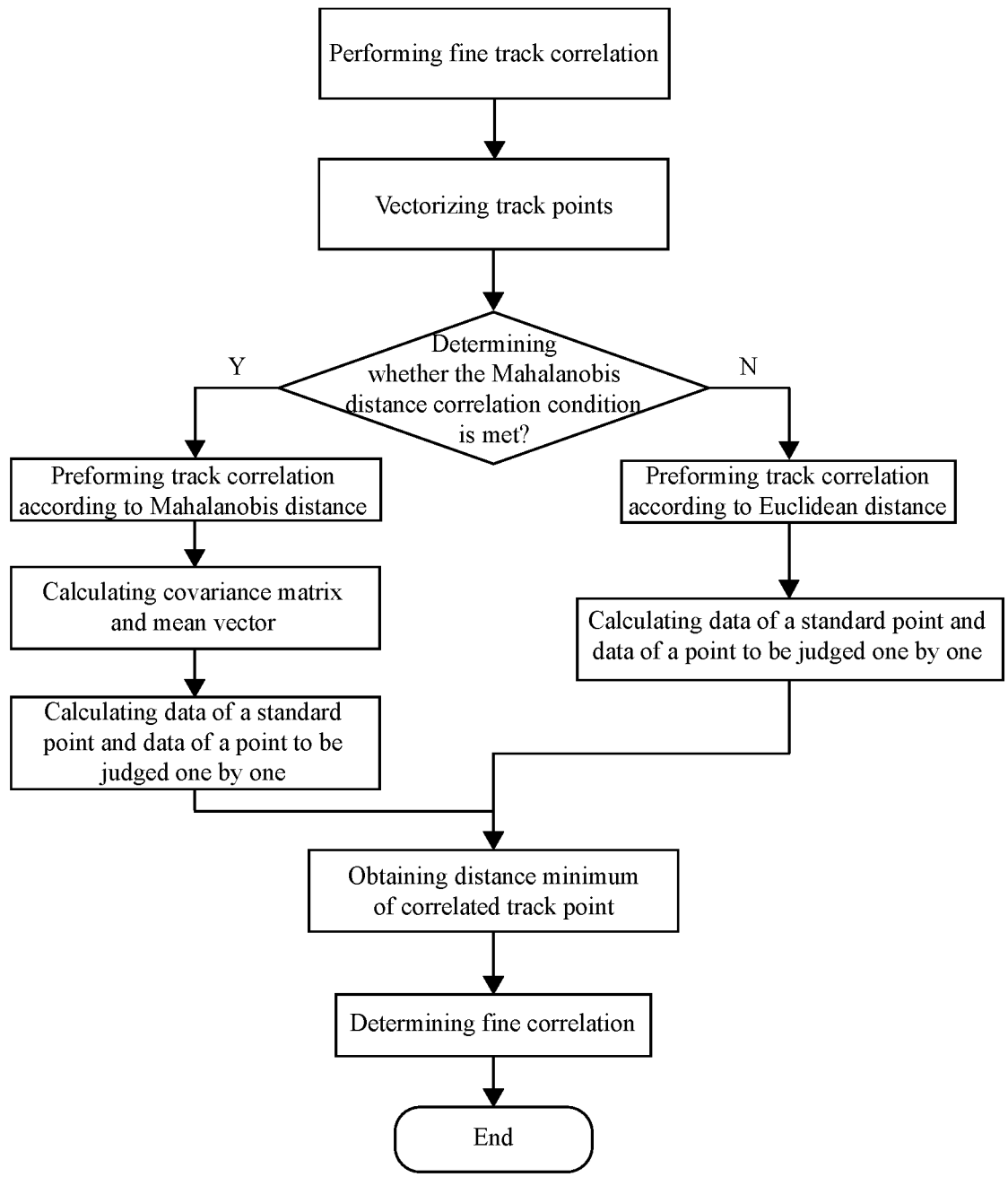
FIG. 3 is a flowchart of a track fine correlation in the construction of the track correlation model according to an embodiment of the present disclosure.

As shown in FIG. 3, the fine correlation are as follows.

In the fine correlation stage, the Euclidean distance and Mahalanobis distance calculation based on statistical theory are considered as the measurement basis for the similarity of the track, and the distance calculation algorithm is used to calculate and compare the distance before and after the target voyages.

Multi-dimensional Euclidean distance calculation is shown in formula (9).

$$d(X, Y) = \sqrt{(x_1 - y_1)^2 + (x_2 - y_2)^2 + \ldots + (x_n - y_n)^2} = \sqrt{\sum_{i=1}^{n}(x_i - y_i)^2} \quad (9)$$

In the formula (9), X, Y represent respectively the vectors composed of average speed, position distance, heading and other parameters of GPS and radar target track, and $x_i$, $y_i$ represent the same attribute data of different tracks.

Multi-dimensional Mahalanobis distance calculation is show in formula (10).

$$d(X) = \sqrt{(X-\mu)^T S^{-1}(X-\mu)} \quad (10)$$

In the formula (10), the Mahalanobis distance of the sample vector X to the µis shown, where there are n sample vectors $X_1 \sim X_n$, S is covariance matrix thereof, and µ is mean vector thereof.

The Mahalanobis distance between the vectors $X_i$ and $X_j$ can be expressed as formula (11).

$$d(X_i, X_j) = \sqrt{(X_i - X_j)^T S^{-1}(X_i - X_j)} \quad (11)$$

Two conditions need to be met during calculating Mahalanobis distance: the total number of samples is greater than the sample dimension; and the covariance matrix has an inverse matrix.

Therefore, the Mahalanobis distance conditions are judged firstly during finely correlating the track. The Euclidean distance correlation algorithm is used as a substitute algorithm when the Mahalanobis distance correlation algorithm is not satisfied.

(S108) The fusion data weight allocation model is constructed, and the track fusion is subjected the GPS data information and the target radar information correlated with the GPS data information by using the fusion data weight allocation model.

In an embodiment, the analytic hierarchy process (AHP) and the entropy weight method (EWM) are used to calculate the evaluation index weights of the track influencing factors of the same target, respectively.

The first-level evaluation indexes include GPS reliability and radar reliability. The secondary-level evaluation indexes include data values of the speed V1, the latitude and longitude L1, and heading C1 used to describe the same target track by GPS; and data values of the speed V2, the latitude and longitude L2, the heading C2 used to describe the same target track by the radar.

In an embodiment, the step (S108) is performed through the following steps.

(S1082) A weight of an evaluation index of a track influence factor is determined as a first weight vector according to an analytic hierarchy process.

In an embodiment, the first weight vector is obtained through the following method.

The weight vectors of U(V), U(L), U(C) are determined by the AHP and the steps are as follows.

(1) The judgment matrix is constructed. With U(V), U(L), U(C) as criterions of the judgment matrix, different criterions have different weight vectors in the subjective impression of different decision makers. The A-U judgment matrix P is composed of $U_{ij}$.

$$P = \begin{bmatrix} u_{11} & u_{12} & u_{13} \\ u_{21} & u_{22} & u_{23} \\ u_{31} & u_{32} & u_{33} \end{bmatrix} \quad (12)$$

(2) The importance is calculated and ranked. According to the judgment matrix, the feature vector W corresponding to the largest eigenvalue $\lambda_{max}$ is calculated. The formula is as follows.

$$P_w = \lambda_{max} w \quad (13)$$

The desired feature vector W is normalized to get W=(W$_1$, W$_2$, W$_3$). W is the importance ranking of the evaluation indexes, that is, the weight allocation.

(3) In order to judge the rationality of the obtained weight allocation, the consistency test is conducted on the judgment matrix. The consistency test uses the formula (14).

$$CR = CI/RI \quad (14)$$

In the formula (14), CR is the random consistency ratio of the judgment matrix; and CI is the general consistency index of the judgment matrix.

CI is obtained by formula (15).

$$CI = (\lambda_{max} - n)/(n-1) \quad (15)$$

RI is the average random consistency ratio of the judgment matrix; and n is the order of the judgment matrix P.

When CR of the judgment matrix P is less than 0.1 or less than $\lambda_{max}$, P is considered to have satisfying consistency; otherwise, the elements in P need to be adjusted to meet satisfying consistency.

After obtaining one matrix P with satisfying consistency, the individual components of W=(W$_1$, W$_2$, W$_3$) are the weight values obtained by the AHP.

(S1084) A weight of the evaluation index of the track influence factor is determined as a second weight vector by using an entropy weight method.

In an embodiment, the second weight vector is obtained through the following method.

The weights of U(V), U(L), U(C) is determined by the EWM and the steps are as follows.

(1) The numerical matrix is constructed. U(V), U(L), U(C) are as criterions of the numerical matrix. The A-X numerical matrix W is composed of $X_{ij}$.

$$W = \begin{bmatrix} x_{11} & x_{12} & x_{13} \\ x_{21} & x_{22} & x_{23} \\ \vdots & \vdots & \vdots \\ x_{n1} & x_{n2} & x_{im} \end{bmatrix}$$

N samples and m indexes for each sensor are selected. $x_{ij}$ is the value of the j-th index of the i-th sample (1=1, 2 ..., n; j=1, 2, ..., m).

(2) Indexes are normalized: homogenization of heterogeneity indexes. The specific methods are as follows.

Positive index:

$$x'_{ij} = \frac{x_{ij} - \min\{x_{ij}, \ldots, x_{nj}\}}{\max\{x_{1j}, \ldots, x_{nj}\} - \min\{x_{ij}, \ldots, x_{nj}\}}$$

Negative index:

$$x'_{ij} = \frac{\max\{x_{1j}, \ldots, x_{nj}\} - x_{ij}}{\max\{x_{1j}, \ldots, x_{nj}\} - \min\{x_{ij}, \ldots, x_{nj}\}}$$

where min $x_j$ is the minimum value of the j-th index; and max $x_j$ is the maximum value of the j-th index.

(3) The characteristic weight of the numeric value is calculated in group i of the j-th index.

$$P_{ij} = \frac{x'_{ij}}{\sum_{i=1}^{n} x'_{ij}} \quad (16)$$

Where i=1, ..., n; j=1, ..., m.

(4) The entropy value of item j is calculated.

$$e_j = -k \sum_{i=1}^{n} p_{ij} \times \ln p_{ij} \quad (17)$$

where k=1/ln (n)>0, if the value of $x_{ij}$ is 0, the value of $x_{ij}$ will be replaced with 0.00001, and the value of ln(0.00001) is calculated. The $e_j$ is ≥0.

(5) The weights of each index are normalized.

$$w_j = \frac{1 - e_j}{m - \sum_{j=1}^{m} e_j} \quad (18)$$

where m is the number of $e_j$; and the individual components of W=(W$_1$, W$_2$, W$_3$) are the weight values obtained by the EWM.

(S1086) The combined weight vector is obtained by combining the first weight vector and the second weight vector.

In the above steps, the feature vector W obtained by AHP and EWM is the index weight, and the two index weights are set to $A_i^1$ and $A_i^2$, and combined to obtain the combined weight vector.

The index weight vector obtained by the AHP is:

$$A_i^1 = [a_1^1 a_2^1 a_3^1 \ldots a_m^1] \quad (19)$$

The index weight vector obtained by the EWM is:

$$A_i^2 = [a_1^2 a_2^2 a_3^2 \ldots a_m^2] \quad (20)$$

Among, i is the i-th index in the first-level evaluation indexes, and m is the number of subordinate second-level evaluation indexes of the i-th index in the first-level evaluation indexes. The combined weight vector is calculated using AHP and EWM. The combined weight vectors of the indexes to be evaluated are calculated using the following formula.

$$A_i = \alpha A_i^1 + (1-\alpha) A_i^2 \quad (21)$$

where the α is the coefficient for determining the combination weights; 0≤α≤1, usually α is 0.5. When the α is 1, the index weight value is determined by the AHP. When the α is 0, the index weight value is determined by EWM, as shown in Table 1.

| First-level evaluation index | Weight value | Second-level evaluation index | AHP | EWM | Combination weight value |
|---|---|---|---|---|---|
| GPS | Wg | Speed | W1 | W'1 | A1 |
| Radar | Wd | Latitude and longitude | W2 | W'2 | A2 |
| | | Heading | W3 | W'3 | A3 |

Each component of A=(A$_1$, A$_2$, A$_3$) can be used as the weight coefficient of U←{U(V),U(L),U(C)}, and the weight allocation of each component forms a data fusion strategy.

(S1088) The track fusion is subjected to the GPS data information and the target radar information correlated with the GPS data information according to the combined weight vector.

Vector matrix of the speed V, longitude and latitude L, and heading C data values of the same target track described by GPS and radar, is multiplied by the combination weight matrix, and the fusion track values of x and y are calculated to obtain $S_{ij}$ and $S'_{ij}$, respectively.

$$S_{ij}=S_{ix}+S_{jx} \quad (22)$$

$$S'_{ij}=S_{iy}+S_{jy} \quad (23)$$

where i represents the measurement track of the GPS sensor; and j represents the measurement track of the radar.

Figures 4, 5:
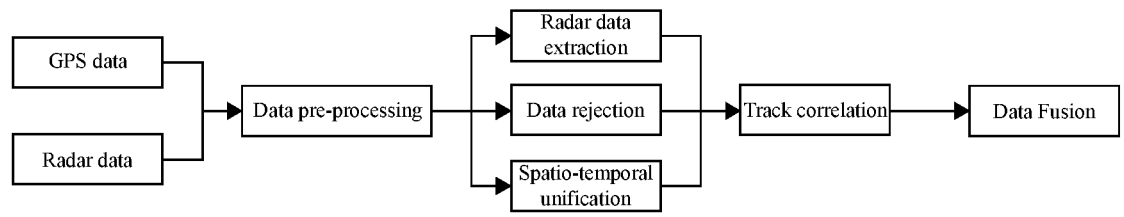
FIG. 4 is a schematic diagram showing design principle of a data fusion framework for location of the unmanned surface vehicle according to an embodiment of the present disclosure.
FIG. 5 is a block diagram of a track fusion device for unmanned surface vehicles according to an embodiment of the present disclosure.

According to GPS and radar data characteristics, this application provides a USV positioning data fusion framework ideas, as shown in FIG. 4.

(1) In the target area, the navigation target USV transmits its own GPS data information to the shore-based end and then to the USV receiving end. Radar data information is obtained by the USV carrier-based navigation radar data link.

(2) In the data pre-processing stage, for the radar data information, the radar image data completes coordinate conversion, target matching, distance and orientation conversion, longitude and latitude conversion, etc., and further completes the processing such as data rejection, spatio-temporal unification of the data.

(3) The track correlation model is constructed, and the track correlation is performed using the multi-dimensional Euclidean distance calculation method and the multi-dimensional Mahalanobis distance calculation method.

(4) The track data is performed data fusion by the weighted data fusion algorithm of the AHP and EWM.

As shown in FIG. 5, this application further provides a track fusion device for unmanned surface vehicle, including an information acquisition module 502, a data preprocessing module 504, a track correlation module 506, and a track fusion module 508. The information acquisition module 502 is configured to obtain perception information of the unmanned surface vehicle, the perception information includes GPS data information and radar data information.

The data preprocessing module 504 is configured to pre-process the radar data information to obtain target radar information.

The track correlation module 506 is configured to construct a track correlation model and perform track correlation between the GPS data information and the target radar information based on the track correlation model.

The track fusion module 508 is configured to construct a fusion data weight allocation model and subject the GPS data information and the target radar information correlated with the GPS data to track fusion.

The original data obtained from a test is processed, and a comparative analysis is performed on the target GPS track, radar track and fused track. The north direction is the positive direction of the y-axis, the east direction is the positive direction of the x-axis, and the obtained target navigation trajectory is shown in FIG. 6.

Figure 6:
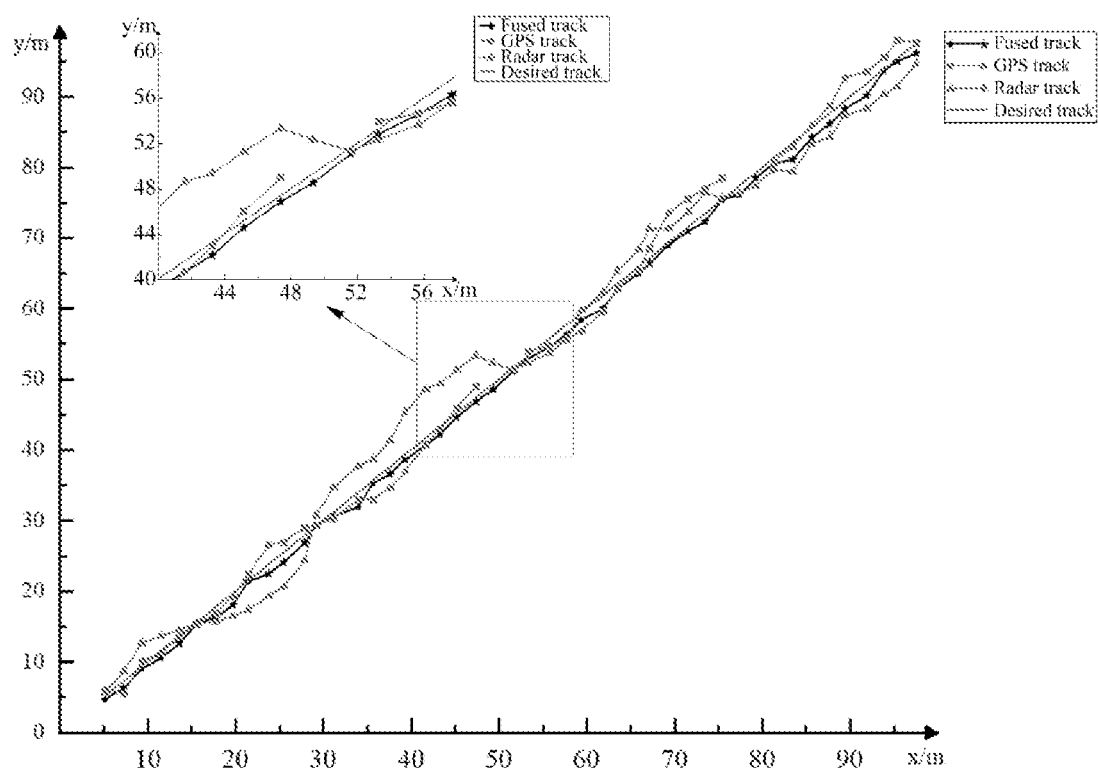
FIG. 6 schematically illustrates comparison of a radar target track, a GPS target track, a fused target track and a desired target track according to an embodiment of the present disclosure.

In FIG. 6, it can be obtained that the radar target track fluctuates greatly. The GPS target track is relatively stable, but sometimes the data is temporarily missing. The fusion target track is stable and credible, which is basically consistent with the target steady track, and has higher credibility.

Compared to the prior art, the present disclosure has the following beneficial effects.

(1) Based on the fusion of GPS data and radar data, this application can solve the problems of unstable transmission frequency and backhaul delay in the GPS data transmission and problems of sea clutter interference and small scanning distance in the radar data transmission. Through the correlation and fusion, the complementarity of GPS data and radar data in the perception of maritime targets is achieved.

(2) This application constructs a track correlation mathematical model through the combination of the fine correlation and the rough correlation, and uses the multi-dimensional Euclidean distance calculation method and the multi-dimensional Mahalanobis distance calculation method to perform target track correlation. Therefore, this application can provide various ways for identifying the same target track, improving the matching calculation speed, and saving the computing resources.

(3) This application constructs a fusion data weight allocation model based on the combination of the analytic hierarchy process and the entropy weight method, and thus has a higher reliability.

It should be noted that the data information in the embodiments may be coordinate information, longitude and latitude information, a combination of speed, position distance and heading angle, or a combination of speed, longitude, latitude, and heading.

It should be noted that the embodiments described above are only used to illustrate the technical solutions of the present disclosure, but not intended to limit the present disclosure. It should be understood that any modifications and replacements made by those skilled in the art without departing from the spirit of the disclosure should fall within the scope of the disclosure defined by the appended claims.

What is claimed is:

1. A track fusion method for an unmanned surface vehicle, comprising:
  (a) obtaining perception information of the unmanned surface vehicle, wherein the perception information comprises global positioning system (GPS) data information and radar data information;
  (b) pre-processing the radar data information to obtain a target radar information;
  (c) constructing a track correlation model; and performing track correlation between the GPS data information and the target radar information by using the track correlation model; and
  (d) constructing a fusion data weight allocation model; and subjecting the GPS data information and the target radar information correlated with the GPS data information to track fusion by using the fusion data weight allocation model;
  wherein the step (c) is performed through steps of:
  (c1) subjecting the GPS data information and the target radar information to rough correlation by using a rough correlation model to obtain a rough correlation database;
    wherein the rough correlation is performed as follows:
    performing distance calculation GPS longitude and latitude data and radar parsing latitude and longitude data at a certain time one by one;
    setting a distance threshold to determine whether the rough correlation between two points is successful; if a calculated distance is greater than the distance threshold, the two points are judged to be impossible to be associated; if the calculated distance is less than the distance threshold, the two points are judged to undergo successful rough correlation; and
    recording points that have established the rough correlation relationship to the rough correlation database for fine correlations of subsequent track; and
  (c2) subjecting GPS data information in the rough correlation database and the target radar information to the fine correlation to screen GPS data information and target radar information satisfying fine correlation relationship;

wherein GPS data information in the rough correlation database and the target radar information are processed by using a multi-dimensional Euclidean distance calculation method and a multi-dimensional Mahalanobis distance calculation method.

2. The track fusion method of claim 1, wherein the step (b) is performed through steps of:

(b1) carrying out data extraction on the radar data information to obtain an intermediate data set;

(b2) processing data rejection on the intermediate data set to obtain the target radar information; and (b3) subjecting data in the target radar information and the GPS data information to spatio-temporal unification.

3. The track fusion method of claim 2, wherein the step (b1) is performed through steps of:

(b11) subjecting the radar data information to Cartesian coordinate conversion to obtain a converted data set;

(b12) according to the converted data set, dividing a graph corresponding to the radar data information into multiple subgraphs;

(b13) performing matching between the multiple subgraphs and a target template graph; to select an optimal matched subgraph; and (b14) determining the intermediate data set according to the optimal matched subgraph.

4. The track fusion method of claim 2, wherein the step (b2) is performed through steps of:

(b21) determining a first distance according to a coordinate of a first moment and a coordinate of a second moment in the intermediate data set;

(b22) obtaining a time difference between the first moment and the second moment;

(b23) obtaining a second distance according to an average speed between the first moment and the second moment and the time difference;

(b24) obtaining a distance difference between the first distance and the second distance;

(b25) if the distance difference is within a preset threshold range, determining the coordinate of the second moment as a bad value and eliminating the bad value; and (b26) traversing all data in the intermediate data set according to steps (b21)-(b25) to obtain and eliminate all bad values in the intermediate data set, so as to obtain the target radar information.

5. The track fusion method of claim 1, wherein the step (d) is performed through steps of:

(d1) determining a weight of an evaluation index of a track influence factor as a first weight vector according to an analytic hierarchy process;

(d2) determining a weight of the evaluation index of the track influence factor as a second weight vector by using an entropy weight method;

(d3) combining the first weight vector with the second weight vector to obtain a combined weight vector; and (d4) subjecting the GPS data information and the target radar information correlated with the GPS data information to the track fusion according to the combined weight vector.

6. The track fusion method of claim 5, wherein the step (d1) is performed through steps of:

(d11) constructing a judgment matrix;

(d12) determining a weight assignment vector according to a feature vector corresponding to a largest eigenvalue in the judgment matrix; and (d13) when the judgment matrix has satisfying consistency, determining the weight assignment vector as the first weight vector.

7. The track fusion method of claim 6, wherein the step (d2) is performed through steps of:

(d21) constructing a numerical matrix with a plurality of numeric values;

(d22) normalizing the plurality of numeric values in the numerical matrix to obtain a positive index and a negative index corresponding to each of the plurality of numeric values;

(d23) obtaining a characteristic weight of a corresponding numeric value according to the positive index and the negative index;

(d24) determining an entropy value of a corresponding index according to the characteristic weight; and (d25) normalizing entropy values of indexes to obtain the second weight vector.

* * * * *